United States Patent [19]
Hess

[11] Patent Number: 5,946,639
[45] Date of Patent: Aug. 31, 1999

[54] IN-SITU STABILIZATION OF RADIOACTIVE ZIRCONIUM SWARF

[75] Inventor: Clay C. Hess, Idaho Falls, Id.

[73] Assignee: The United States of America as represented by the Department of Energy, Washington, D.C.

[21] Appl. No.: 08/917,353

[22] Filed: Aug. 26, 1997

[51] Int. Cl.$^6$ .................. G21F 9/00; C09K 3/00
[52] U.S. Cl. .................. 588/6; 588/16; 588/18; 588/15; 252/625
[58] Field of Search .................. 588/8, 15, 6, 7, 588/18, 16; 252/625, 634; 976/DIG. 321, 324, 391, 394, 395

[56] References Cited

U.S. PATENT DOCUMENTS

| | | | |
|---|---|---|---|
| 3,723,338 | 3/1973 | Godfrey | 252/301.1 W |
| 4,129,518 | 12/1978 | Huppert et al. | 252/301.1 |
| 4,131,563 | 12/1978 | Bahr et al. | 252/628 |
| 4,297,827 | 11/1981 | Allison | 53/282 |
| 4,315,831 | 2/1982 | Morin et al. | 252/628 |
| 4,459,212 | 7/1984 | Carini | 252/628 |
| 4,585,583 | 4/1986 | Roberson et al. | 252/628 |
| 4,834,917 | 5/1989 | Ramm et al. | 252/633 |
| 4,851,155 | 7/1989 | Kanagawa et al. | 252/628 |
| 4,859,395 | 8/1989 | Unger et al. | 264/254 |
| 4,927,564 | 5/1990 | Barlou et al. | 252/628 |
| 4,929,394 | 5/1990 | Kitagawa et al. | 252/633 |
| 5,318,730 | 6/1994 | Rieser et al. | 252/628 |

OTHER PUBLICATIONS

Diane J. Harrison, "Spent–Fuel Decladding, Radioactive Waste Management", ANS 1987 Winter Meeting, Los Angeles, CA Nov. 1987.

"BNFL Opens First Plant for ILW Encapsulation", Nuclear News Magazine, Dec. 1991, pp. 55–57.

Federal Register, vol. 54, p. 48421, Nov. 22, 1989.

55–FR–22546 Federal Register, vol. 55, p. 22546, Jun. 1, 1990.

R.M. Neilson, Jr., et al., "EIPCOR–II Resin Waste Form Testing", NUREG/CR–4637 EGG–2457, Oct. 1986.

R. M. Neilson, Jr., et al., "Solidification of EIPCOR–II Resin Waste Forms", GEND–INF–055, Aug. 1984.

"BNFL Opens First Plant for ILW Encapsulation", Nuclear News Magazine, pp. 55–57, Dec. 1991.

Federal Register, vol. 54, p. 48421, Nov. 1989.

*Primary Examiner*—Gary P. Straub
*Assistant Examiner*—Melanie C. Wong
*Attorney, Agent, or Firm*—Virginia B. Caress; William R. Moser; Paul A. Gottlieb

[57] ABSTRACT

The method for treating ignitable cutting swarf in accordance with the present invention involves collecting cutting swarf in a casting mold underwater and injecting a binder mixture comprising vinyl ester styrene into the vessel to fill void volume; and form a mixture comprising swarf and vinyl ester styrene; and curing the mixture. The method is especially useful for stabilizing the ignitable characteristics of radioactive zirconium cutting swarf, and can be used to solidify zirconium swarf, or other ignitable finely divided material, underwater. The process could also be performed out of water with other particulate wastes.

21 Claims, 6 Drawing Sheets

IN-SITU STABILIZATION OF RADIOACTIVE ZIRCONIUM SWARF

BACKGROUND OF THE INVENTION

1. Field of the Invention

The present invention is directed to a treatment process to stabilize ignitable characteristics of finely divided zirconium and produce an acceptable radioactive waste form.

2. Description of the Related Art

Untreated radioactive zirconium swarf is prohibited from land disposal under current Environmental Protection Agency (EPA) regulations due to its ignitable characteristic.

In-situ stabilization provides a means to treat the ignition hazards associated with zirconium swarf while producing a final radioactive waste form using a cost effective process.

Zirconium alloys are commonly used within the nuclear industry as a core cladding material. When the nuclear core has exceeded its useful life it is often cut-up and repackaged for storage or disposal processing Zirconium swarf generated as a by-product of the cutting operations is considered a mixed hazardous and radioactive waste. The swarf is hazardous due to its ignitable characteristic and is radioactive since it has been highly irradiated within the reactor.

When zirconium and zirconium alloys are finely divided, the ignitable propensity of the material is increased similar to magnesium and other reactive metals. Zirconium swarf generated by common cutting operations is small enough that it is often considered hazardous under EPA regulations (40 CFR 261.21(a)(2)). Since there are currently no facilities available to dispose of a mixed waste and because it is substantially impossible to remove the radioactivity from the material other than eventual decay, the ignitable characteristic of the material must be treated to render it non-hazardous. Once the hazardous characteristic has been treated, the waste is no longer classified as a mixed waste and it can be disposed of as a radioactive waste provided the waste form meets radioactive waste regulations (10 CFR 61).

Although work has been done to treat zirconium swarf by diluting it with cement grout, this method is limited to a small weight percent of zirconium. When higher amounts of zirconium are mixed with cement grout, ignition of the material may still occur. Utilization of approved mixing ratios of zirconium-to-cement grout results in significant volume and weight increases of the waste form.

Utilization of cement grout has been considered acceptable by the EPA. Although cement is still commonly used for solidifying radioactive waste there is some movement by the Nuclear Regulatory Commission to restrict its use due to strength and radiolysis (particularly hydrogen generation) concerns under high radiation doses.

Oxidation of non-radioactive zirconium swarf is commonly used by zirconium producers to treat the swarf prior to land disposal. Although this process is effective; however, it is costly to comply with safety requirements and meet EPA regulations to control off-gas emissions. Oxidation of radioactive zirconium would require even more costly controls to ensure safety and preclude the emission of radioactive off-gas particulate.

Limited information is found in the literature related to stabilizing zirconium cutting swarf. Most of the information available is related to solidification with hydraulic cements (such as portland cement, gypsum, and concrete) that harden by chemical reaction with water.

A solid matrix has been used to dispose of irradiated zirconium swarf generated in the process of decladding spent fuel from the Enrico Fermi reactor. Swarf accumulated from grinding-off the zirconium cladding (with some diffused uranium) of approximately 420 fuel pins was solidified in several gypsum.castings and disposed of at the Nevada Beatty Site. Testing of castings with non-radioactive zirconium swarf showed that the ignitable propensity of the zirconium was stabilized when the castings contained less than 5 weight percent zirconium.

A cement grout solidification process has also been used to dispose of swarf composed of zirconium cladding and uranium oxide. The swarf was generated when sectioning a test reactor core with an abrasive cut-off saw. Testing of castings with non-radioactive zirconium swarf showed that the ignitable propensity of the finely divided zirconium was stabilized in a casting containing 1 weight percent zirconium. The solidified waste form was disposed of at the Idaho National Engineering Laboratory (INEL) Radioactive Waste Management Complex.

Encapsulation of magnesium swarf generated when mechanically stripping-off Magnox (magnesium alloy) fuel cladding from the British gas cooled reactor fuel has also been used. Magnesium has an ignitable propensity comparable to zirconium and other reactive metals such as aluminum, titanium, uranium, etc. when in a finely divided form. A plant was built to process the Magnox swarf with cement grout and blast furnace slag.

It has been reported that solidified concrete castings of a mixture of zirconium and uranium swarf ignited as the castings solidified during the curing process. Ignition of the castings was attributed to curing the castings in a hot building and due to the heat of hydration generated as the casting cured. Subsequent testing has shown that the castings would ignite with mixtures containing approximately 20 weight percent of uranium metal.

To prevent ignition of zirconium swarf, it is often stored submerged in water. This has made the use of hydraulic cements attractive as a solidification binder since the water used to store the swarf in can be used to mix and harden the cement. However, if the swarf is stored with excessive amounts of water, the swarf must be removed from the water or at least partially drained. The primary disadvantage of using hydraulic cements is the increased volume of the waste form. The Environmental Protection Agency (EPA) initially considered solidification of radioactive zirconium swarf with cement as impermissible dilution since they had been processed with relatively low waste concentrations. After public comments and further review, cement solidification was accepted as a viable technology for stabilizing radioactive zirconium swarf An alternate solidification binder was sought that would generate less waste volume than hydraulic cements and which could be injected directly into zirconium swarf waste which is submerged under several feet of water. By maintaining the water coverage over radioactive swarf, radiation exposure to personnel processing the waste is minimized and the swarf is protected from ignition sources. The potential for the casting igniting due to the heat generated by the exothermic reaction of the curing process is eliminated by using an underwater process. Underwater solidification minimizes handling of the waste and utilizes the water to provide an inherently safe work condition. Such an underwater process was unavailable; consequently, work was begun to determine if such a process could be developed.

It was discovered that solidification binders, such as hydraulic cements, would be unacceptable for underwater processing. It was desired to have a low viscosity liquid binder which would penetrate the waste and then solidify underwater. It was found that vinyl ester-styrene had properties attractive for this application but had never been used in an underwater process.

Dow Chemical began the development of vinyl ester-styrene (VES) as a solidification binder for radioactive waste in the 1970's. Dow performed extensive testing to get it accepted by U.S. regulatory agencies and radioactive waste burial sites. Dow eventually discontinued marketing efforts due to the relatively low cost of radioactive waste burial at the time and the introduction of High Integrity Containers which were more competitive for radioactive waste disposal. Later when radioactive waste burial costs escalated, Diversified Technologies began using VES for processing radioactive ion exchange resin beads and sludge wastes. Diversified Technologies processes waste for commercial nuclear power plants using VES and has promoted using the product for other waste applications. EG&G Idaho, Inc., performed waste form testing for the Department of Energy and the Nuclear Regulatory Commission to show that VES would meet the regulatory requirements to solidify ion exchange resins from the clean-up of the damaged Three Mile Island reactor.

U.S. Pat. No. 4,585,583, ROBERSON et al., relates to solidifying ion exchange resin beads using a solidification binder formulation comprising vinyl ester-styrene and a benzoyl peroxide catalyst, and an in-situ process that blends the solidification binder into the waste without mixing.

U.S. Pat. No, 4,297,827, ALLISON et al., relates to a solidification process to prepare radioactive waste for dumping in the ocean and is directed toward solidifying ion exchange resin beads.

U.S. Pat. No. 3,723,338, GODFREY et al., relates to a solidification process to immobilize contaminants in granular media such as soil.

U.S. Pat. No. 5,318,730, RIESER et al., relates to a spray process to coat the exterior of a waste, and more specifically is directed toward preparing large contaminated items that must be shipped or stored temporarily prior to disposal.

U.S. Pat. No. 4,851,155, KANAGAWA et al., relates to solidifying granular radioactive material using a vinyl type monomer.

U.S. Pat. No. 4,834,917, RAMM et al. relates to encapsulating a waste by compressing a copper or ceramic powder around the waste.

U.S. Pat. No. 4,929,394, KITAGAWA et al., relates to compacting radioactive metal wastes to prepare them for disposal.

U.S. Pat. No. 4,859,395, UNGER et al., relates to stabilizng hazardous wastes by encapsulating the waste with thin layer of thermosetting plastic using a three stage process.

Prior to the present invention, however, it is not believed that there was an acceptable process to dispose of zirconium swarf underwater or without greatly increasing the waste volume.

BRIEF SUMMARY OF THE INVENTION

Accordingly, the present invention was developed and is directed to an in-situ process for stabilizing ignitable characteristics of finely divided zirconium where a binder material is poured over the swarf without the need for mixing while maintaining the swarf and binder material underwater; thus simplifying the process and increasing its reliability for remote applications.

For the purposes of the present invention, the binder should be tolerant of water on the swarf since the swarf is typically generated with underwater equipment or with some type of water soluble coolant sprayed on the cutting tool.

For the purposes of the present invention the material properties of the binder must also meet the NRC requirements under high radiation doses.

For the purposes of the present invention vinyl ester styrene (VES) is a binder exhibiting preferred properties for this application. VES is used within the nuclear industry to solidify radioactive particulate materials such as resin beads. For purposes of the present invention VES has been discovered to be particularly advantageous due at least in part to the fact that VES has a low viscosity (comparable to water) and can be poured over the waste and fill the void volume without mixing. In accordance with the present invention, by filling the void volume rather than mixing the swarf with excessive amounts of binder, the original waste volume stays the same rather than being increased. Since mixing within a contaminated environment is eliminated, the process is greatly simplified (which is desirable because the process reliability is reduced by complexity, especially when performed remotely) and eliminates concerns relative to the swarf being evenly mixed or dispersed in the binder. VES has been discovered to work well with damp wastes. When solidifying resin beads previously drained of free liquids the VES further displaces residual liquids from the waste as it is poured over the waste and encapsulates any entrapped liquids which may remain. VES has been tested for compatibility (radiation resistance, compressive strength, leachability, corrosion, etc.) with radioactive waste and has an approved Nuclear Regulatory Commission (NRC) Topical Report.

In accordance with the present invention, the solidification binder formulation must also be carefully controlled to achieve complete penetration of the waste and to produce a casting which meets the final waste form requirements.

Although the present invention uses vinyl ester which is a type of polyester, it does not react with the water to harden. Preferably, the present invention does not use cement or any of the additives disclosed in U.S. Pat. No. 4,297,827.

For purposes of the present invention, the combination of the selected promoter, additive, and cooling is important to eliminate voids in the casting and perform the process underwater.

In accordance with the present invention, the waste is solidified without the need to mechanically mix the binder into the waste.

In accordance with the present invention, a mold was developed, having distribution orifices on the top and bottom of the waste, to avoid incomplete solidification and the formation voids. Without such a mold, voids and incomplete solidification occurs in the casting. It was also discovered that it was necessary to compress the waste, and use a controlled pour rate to ensure acceptable solidification.

In accordance with the present invention, the process is performed underwater and uses gravity to permeate the waste with the binder rather than a vacuum; and the present invention is particularly suitable to treating ignitable metal swarf that is completely submerged.

In this regard, the present invention is directed to a process to solidify waste which is completely submerged in water (to provide radiation shielding) and disposed of in a radioactive waste landfill. The process of the present invention allows the waste to be solidified while submerged completely underwater without requiring any mixing in the waste. In accordance with the present invention, the vinyl ester in the binder is hardened by the reaction with additives placed in the binder material just prior to injecting underwater into the waste. The formulation used in accordance with the present invention will not harden by reacting with the water as will the formulation used, eg. in U.S. Pat. No. 4,297,827.

In accordance with the present invention, waste is placed in an engineered mold which ensures that the binder completely penetrates the waste and prevents the formation of voids.

Although not wishing to be bound by any particular theory, styrene is believed to lower the viscosity of the binder.

In accordance with the present invention, heat is not used to cause the binder to solidify. In fact, the opposite is the case in that the binder is cooled below room temperature before use to slow the reaction once the promoter ingredient is added to the binder.

The process of the present invention does not use heat or pressure to process the waste.

DETAILED DESCRIPTION OF THE INVENTION

Figure 1:
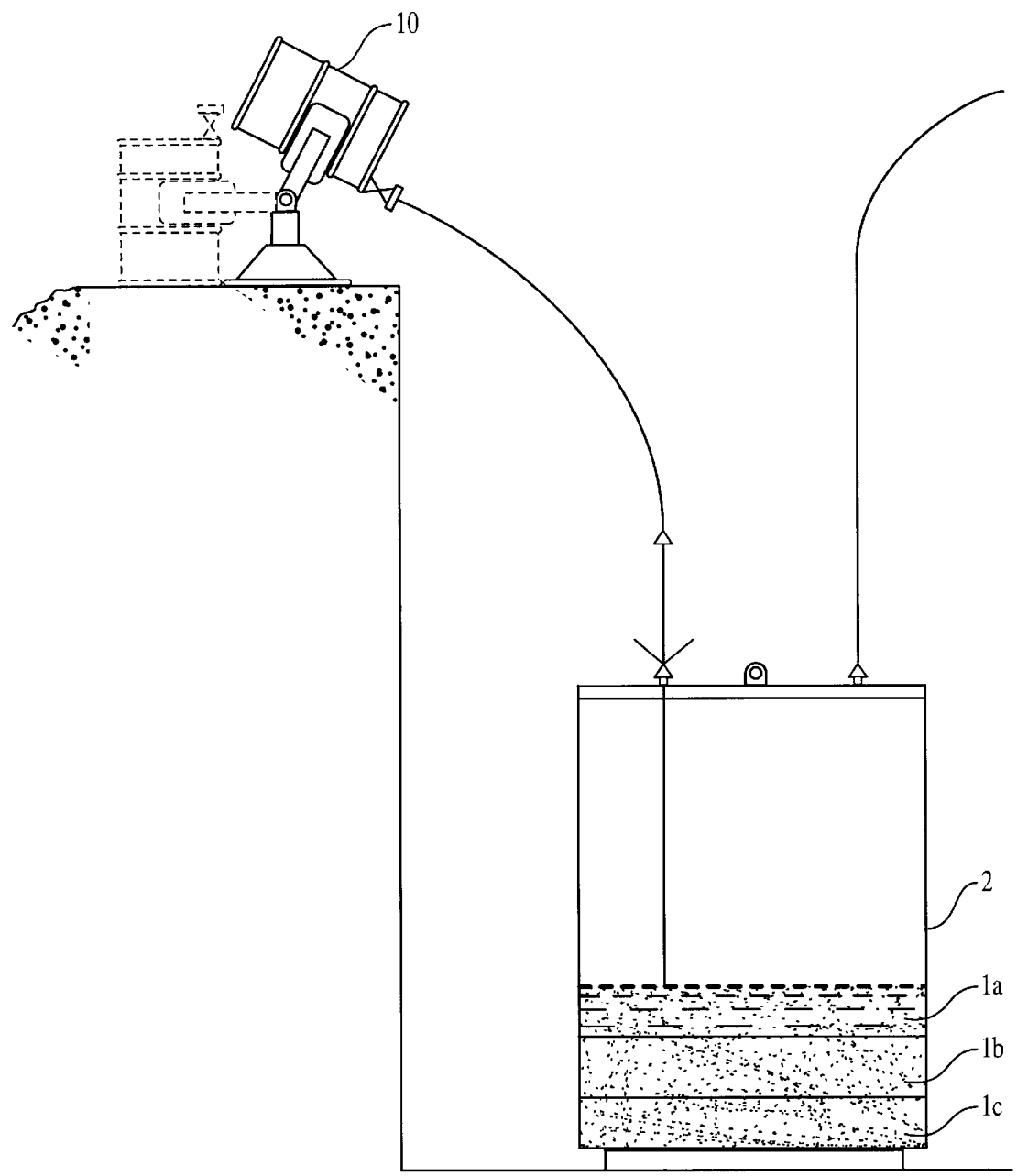
FIG. 1 shows a process for solidification of zirconium swarf in layers.

The process for stabilizing ignitable characteristics of zirconium in accordance with the present invention comprises:

Collecting swarf uncompacted and placing in a casting mold underwater;

Injecting the VES into the mold until the void volume is filled;

Allowing the mixture to cure in a controlled and monitored area; and

Preparing the stabilized can for shipment to the disposal site (shielding surveys, etc.)

Although not wishing to be bound by any particular theory, it is believed that the zirconium ignitability characteristic is stabilized in this process by:

(1) displacing all the oxygen which would sustain combustion, (2) encapsulating the swarf to prevent an ignition source from initiating combustion, and (3) inhibiting flame propagation by having the binder disrupt the flame propagation path and provide a heat sink to impede temperature rise.

Since the process of the present invention accommodates treating the swarf in small quantities as the swarf is being generated, the fire safety of the cutting operation is enhanced. Housekeeping and limiting accumulating quantities of swarf are key controls relative to fire safety with divided zirconium. This process provides a clean method of treating the ignitability of the swarf without causing it to be further dispersed in the work area. Because the process is simple and can be applied directed to the can the swarf is collected in, small quantities of the swarf can be treated as it is generated and thus prevent the accumulation of ignitable swarf.

The final waste form meets the performance objectives required by the NRC regulations for radioactive wastes. The waste form is solid (no voids) such that land subsidence concerns at the burial site are eliminated. The waste form is free of liquids or particulate which could be spilled in a handling accident or migrate into the ground water The integrity of the waste form will be retained for the life of the radioactive isotopes contained.

In-situ stabilization of zirconium swarf provides an economical and efficient means of processing ignitable and radioactive zirconium for disposal which was previously unavailable. This process enables stabilizing the ignitable characteristics of zirconium swarf while producing an acceptable radioactive waste form and enhancing fire safety of zirconium cutting operations.

In-situ treatment of ignitability differs from known processes at least in part because, it is a more passive and simplified approach. Existing processes require more complex operations such as mixing and dispersing the swarf or burning. Inasmuch as in-situ processing is simpler it can be more readily applied thus allowing small quantities to be processed as generated to prevent the accumulation of ignitable waste and enhance fire safety.

Ignitability testing of zirconium swarf solidified with VES has been conducted. Testing has shown that the ignitability characteristic of the swarf is eliminated for any size swarf.

Although this process may be performed in a dry environment, process parameters were developed only for underwater processing. Due to the high radiation levels of the swarf, only underwater processing was pursued such that the water coverage provided the necessary radiation shielding. Application of this process can be extended to include treating the ignitability of other materials considered to have the hazardous characteristic of ignitability. Other reactive metals including magnesium, thorium, hafnium, uranium, and plutonium may also be treated with this process. Radioactive reactive metals such as uranium and plutonium may as a minimum require further processing due to more restrictive requirements for transuranic wastes. Utilization of this process for other solid ignitable wastes may be appropriate but would require consideration of the material properties prior to its use. Processing of ignitable liquid wastes is unlikely although VES has been used to solidify some radioactive liquids.

The present invention is directed to a new underwater solidification process for stabilizing zirconium cutting swarf. As used herein, swarf refers to the kerf debris generated by cutting operations, such as saw dust, cutting chips, lathe burnings, and the like.

Finely divided zirconium such as swarf, is known to present potential hazards due to its ignitable propensity. Radioactive zirconium swarf that is generated during operations to prepare spent nuclear fuel for storage must be stabilized to eliminate potential ignition hazards.

In accordance with the present invention, an underwater stabilization process has been discovered which is desirable since radioactive zirconium swarf is often generated or stored underwater and the water provides an inherently safe environment for the process. The present invention is directed to a process that has been shown to effectively stabilize zirconium swarf underwater. Although zirconium swarf is preferred, the process of the present invention may be extended to other particulate waste types such as other reactive metals, i.e., magnesium, uranium, and the like, which require underwater processing.

VES consists of an unsaturated polyester known as vinyl ester ($CH_2$=CHR) which is diluted with approximately 50wt% of an unsaturated hydrocarbon known as styrene ($C_8H_5CH$=$CH_2$). Styrene is mixed with the vinyl ester monomer to lower the viscosity and polymerize with the vinyl ester. The vinyl ester-styrene mixture is commonly referred to as the VES binder. Vinyl ester liquids are polymerized into a solid by an organic reaction which propagates chain radicals.

To initiate polymerization, free radicals must be introduced to the monomer. This is accomplished by mixing a catalyst, such as benzoyl peroxide, $[C_8H_5COOO]_2$, with the VES binder. A third ingredient referred to as a promoter, such as a tertiary amine, must then be added to thermally decompose the catalyst to generate the free radicals. When the free radicals are in the presence of a vinyl monomer, the radical adds to the double bond and creates another free radical. The new chain radical formed reacts with successive monomers until the supply of monomer is exhausted. The styrene forms a network structure of vinyl ester chains that are joined together by polystyrene chains. An optional fourth ingredient, typically referred to as an additive, is VERI Solidification Additive 1, supplied by Diversified Technologies, may be added to the binder-catalyst-promoter mixture to slow the chain reaction and suppress the peak exothermic temperature.

VES has several properties that make it attractive for underwater solidification.

1. It has a low surface tension such that it strips water from a waste and aids in wetting the waste surfaces to prevent casting voids.

2. It is denser than water (s.g.~1.04). This allows it to be poured into a waste which is submerged in water, penetrate the waste, and displace the water.

3. It has a relatively low viscosity (100–20 cps @ 70° F.) in comparison to other solidification binders This enables it to penetrate a waste without requiring mechanical mixing to blend the binder into the waste.

4. Vinyl ester is less polar than other polyesters and consequently less soluble in water. The insolubility of the binder minimizes leaching from the casting and maintains the structural integrity of the binder/waste matrix. This property is particularly important for wastes that are processed and stored underwater. 5. The carbon-carbon bond in the molecular chain makes vinyl ester more chemically resistant than other unsaturated polyesters; consequently, the casting is less susceptible to attach by corrosive wastes.

Prior to the present invention, it is not believed that vinyl ester styrene (VES) had been used to stabilize wastes with ignitable hazards nor had it been used in an underwater process. Previous applications of VES had been limited to immobilizing radioactive wastes that were dry or damp by encapsulating them in a solid plastic matrix. The present invention is based on the unexpected discovery that ignitable propensity of finely divided zirconium stabilizes with a VES solidification process and the process can be performed underwater.

In a solidified form, VES will burn in a manner comparable to common plastics. Typically, solid VES requires prolonged exposure to a flame to initiate combustion and then self-extinguishes after the flame is removed. In a liquid form, VES is flammable with combustion characteristics similar to motor oil.

It has been determined that the ignition hazard of finely divided zirconium could be stabilized when solidified in a solid matrix using a combustible solidification binder (VES). It was postulated that the VES would eliminate the ignition hazard based on a report that zirconium immersed in oil slowly oxidized without igniting when the oil was set on fire and burned away from the zirconium. Testing with various sizes of divided zirconium, ranging from a finely divided to coarse lathe turnings, showed that ignition hazard was eliminated when the zirconium was solidified into a solid matrix casting using VES as the solidification binder.

In all cases the solid matrix casting burned the same as plain VES without zirconium in it. A 1500–2000° F. torch was used as the ignition source for the tests. The brilliant white sparkling characteristic of burning zirconium was not observed as the castings were exposed to the torch flame. Each casting self-extinguished after the torch flame was removed. The zirconium oxidation rate was reduced such that the hazard (i.e., easy ignition, persistent and vigorous combustion) was eliminated and the resulting waste form was less combustible than commonly accepted wastes, such as paper, wood, and the like.

A fire retardant such as sodium borate, was added to the VES binder to assess its usefulness. The retardant caused the castings to self-extinguish faster; however, it was found to be detrimental in subsequent tests to perform the process underwater. Since the castings self-extinguish without adding a fire retardant to the binder, the use of a fire retardant was omitted.

In comparison to other conventional stabilization processes using hydraulic cements, VES provides a substantial reduction in the weight and volume of the final waste form. For example, the VES waste form weighed 30 times less and had a volume at least 10 times less than the cement grout waste form. The VES process is able to stabilize the zirconium swarf by filling the void spaces; consequently, the original waste volume is not increased. Because the density of the VES solidification binder is approximately three times less than hydraulic cements, the VES final waste form is considerably lighter than those produced by hydraulic cements. The weight of the VES waste form is 30 times less than the cement waste form since the cement process increases the volume ten times and the cement binder is three times as dense (10×3=30). This weight reduction can be especially significant when shipping the waste for land disposal. For example, if shipments are limited by weight constraints, the same amount of waste may require 30 times the number of shipments to dispose of the waste processed with a hydraulic cement process compared to the VES process.

In accordance with the present invention, it has been unexpectedly discovered that the solidification process would stabilize the ignition hazard and can be performed underwater. Related to this an in-situ process was developed so that the solidification binder could simply be poured into the waste without agitating the waste to mix in the binder. Initial testing started with a VES formulation used for solidifying ion exchange resin beads. This formulation produced a peak temperature of approximately 300° F. and, caused local boiling in the surrounding water. The boiling caused the casting to release a residue into the water which compromised the water quality. The higher temperatures also caused the binder to crack in areas of the casting with low concentrations of swarf or areas without any swarf. A fourth ingredient was added to the binder-catalyst-promoter ratio to achieve a formulation that prevents boiling and cracking. At first, testing was done with water at room temperature. Subsequent testing showed that the water temperature significantly affected the peak temperature and how soon the binder began gelation (gel time). Likewise, the beginning temperature of the binder, when it is mixed with the other ingredients, significantly affects the gel time and peak temperature. Considerable effort was given to develop a formulation which would produce an acceptable casting under nominal operating conditions.

Castings may be produced using different methods. The first approach solidifies the zirconium swarf in layers 1a, 1b, 1c, within a standard waste liner 2 using a 55 gallon batch size (FIG. 1). This approach utilizes the liner 2 as a mold for the casting and completely uses the space inside the liner. It was discovered that the layered approach was limited by the bulk density of the swarf being processed. If the swarf has an uncompacted bulk density greater than approximately 2–3 pounds per gallon it was discovered that the process was sensitive to the formation of voids in the casting. The process was discovered to work well for swarf densities less than about 3 pounds per gallon. It was desired that the process handle zirconium swarf produced from a band saw operating at a slow feed rate (bulk density of 4 to 5 pounds per gallon).

It has also been shown that void formation in swarf densities of 4–5 pounds per gallon could be prevented if the binder is injected at the bottom and flows from the bottom to the top of the swarf pile. The use of a less viscous binder (made less viscous by eliminating fire retardant additives) and slowing down the flow rate were also discovered to aid in preventing void formation.

Figure 2:
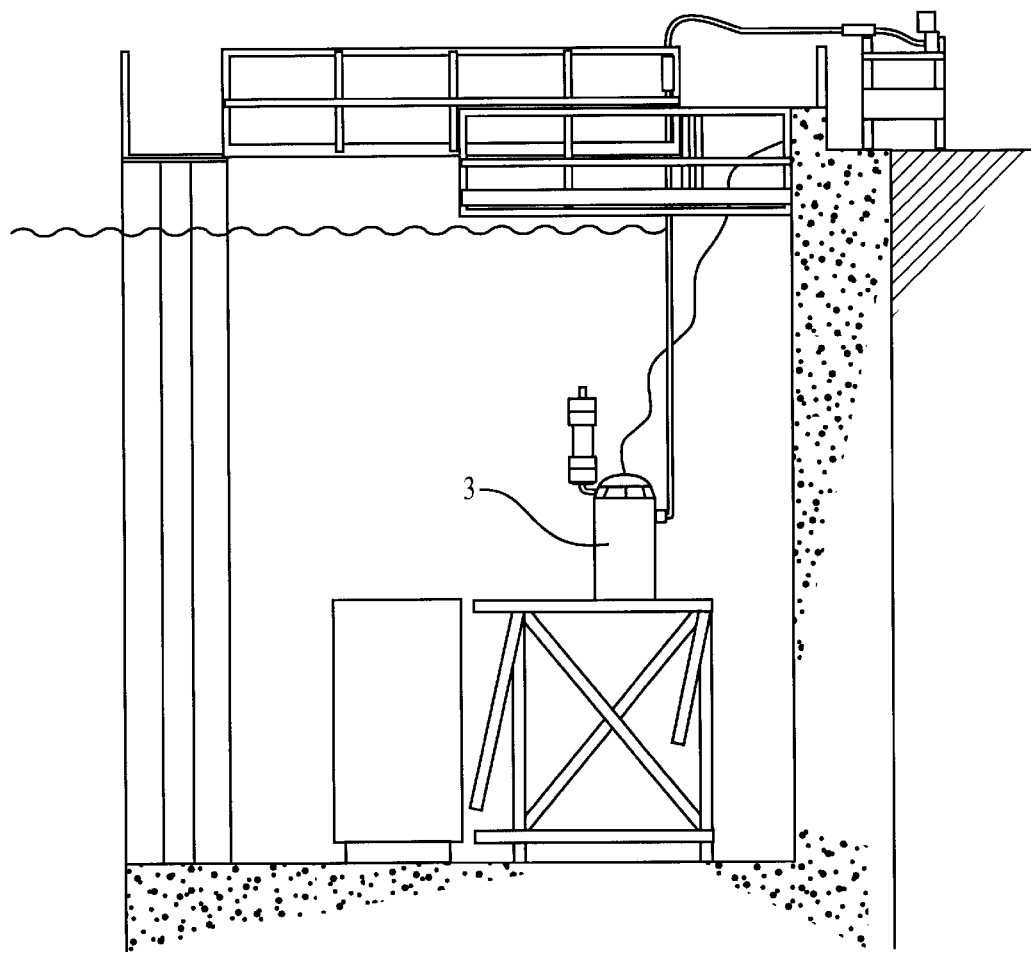
FIG. 2 shows another process for processing swarf.

The layered process was not conducive to bottom injection to prevent void formation when processing higher bulk density swarf. An alternate approach was tried to process the swarf in 50 gallon molds 3 which had pre-installed distribution laterals at the bottom of the mold (FIG. 2). The mold 3 was made of a vinyl ester fiberglass such that the casting bonds to the mold and is integrated into the final waste form. This produced an excellent waste form; however it was susceptible to minor voids at the top of the swarf pile and was vulnerable to gelation beginning prior to completely transferring the premixed formulation into the waste. Void formation at the top of the swarf pile was eliminated by placing an orifice plate on top of the swarf and slightly compressing the swarf in the mold with the orifice plate. It was discovered that gelation of the pre-mixed formulation could be controlled by chilling (cool to approximately 55° F.) the binder prior to mixing. It was preferable to use a smaller batch size to better control the gelation time and accommodate cooling the binder prior to mixing.

Although the 50 gallon mold approach was refined to produce acceptable castings, it was concluded that the process could be better controlled by using a 5 gallon batch size. The smaller batch size was easier to manually handle and eliminated the need to pump the binder into the mold. The final process developed uses a standard 5 gallon plastic bucket as the mold and a bottom and top orifice plate to ensure even flow through the waste. This process repeatedly produces castings without voids and provides ample time to transfer the binder into the waste before it begins to solidify. The 5 gallon batch size was selected as the preferred process to use.

Solidification Process

Figure 3:
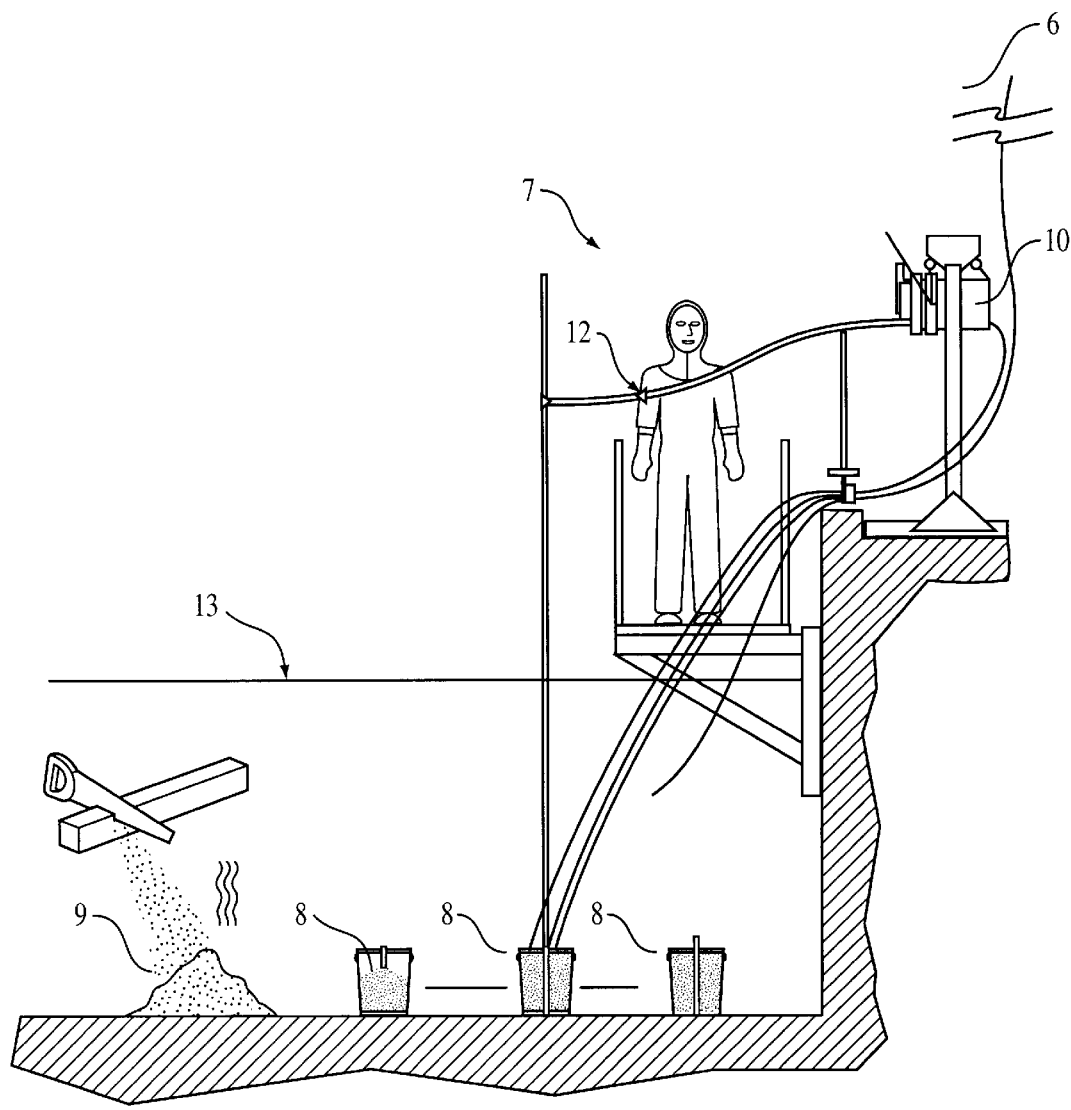
FIG. 3 shows an equipment arrangement used for the pouring process in accordance with the present invention.

An equipment arrangement used for the pouring process in accordance with the present invention is shown in FIG. 3. For radioactive applications, this arrangement allows all the chemicals to be mixed and handled in an area 6 outside a radiologically controlled area 7. The swarf can be loaded underwater 13 into a staged mold assembly 8. By loading the swarf underwater 13, the shielding of the water 13 can be utilized to minimize radiation exposure to personnel. After the swarf 9 is loaded in the mold, the VES formulation is mixed in the pouring bucket 10. The formulation comprises four essential ingredients: binder (vinyl ester-styrene), catalyst (benzoyl peroxide), promoter (tertiary amine), and additive (VERI™ Solidification Additive 1 made by Diversified Technologies, 2580 Westcott Blvd., Knoxville, Tenn. 37931). Once the chemicals are mixed, the lid is placed on the bucket 10 and the bucket is rotated to a horizontal position to start the flow. A tubing valve 12 is located inside the radiological control area so that an operator can make adjustments or stop the flow, if needed, during the pouring process.

Figure 4:
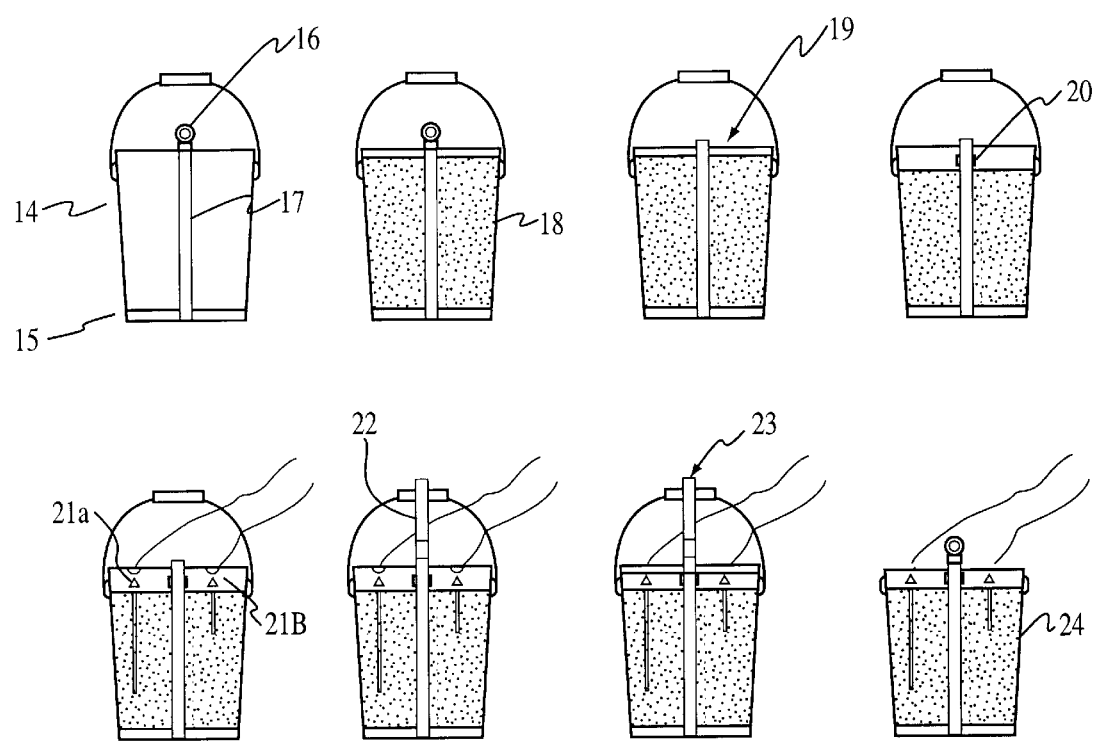
FIG. 4 shows the underwater operations used to process the swarf in accordance with the present invention.

The underwater operations used to process the swarf in accordance with the present invention are shown in FIG. 4. An empty mold assembly 14 is initially staged in the water near the swarf. The mold contains an orifice plate 15 on the bottom to distribute the binder so it flows evenly up through the swarf. A lift cap 16 is initially installed on the standpipe 17 to prevent swarf from getting into the standpipe as it is loaded. In subsequent operations, the lift cap is used to lift and handle the solidified casting after the mold bucket is removed. The mold 18 is then loaded underwater to utilize the shielding of the water and protect the swarf from ignition sources. After loading, the lift cap is removed and a top orifice plate 19 is installed. The orifice plate 19 is designed to force the binder to evenly flow through the swarf and prevent voids forming on the top surface of the swarf. The top orifice plate 19 and bottom orifice plate 15 were developed to ensure an even distribution of the solidification binder over the swarf. A lock-nut 20 is threaded onto the standpipe 17 and tightened to slightly compress the swarf. Compressing the swarf slightly forces a more even flow of the binder through the swarf. Two thermocouples 21a, 21b are inserted through the top orifice plate into the swarf bed. Thermocouples 21a, 21b are used to monitor the peak temperature of the casting as it cures. Because the solidification process is an exothermic reaction, the casting will generate heat as it solidifies and elevate the temperature between 140° F. and 200° F. Temperature monitoring provides a quality assurance check to verify that the casting properly solidified. After the thermocouples are installed, the inlet pipe 22 is attached and the VES formulation 23 is poured into the swarf through the pipe 22. Solidification of the casting occurs several hours after the pour is complete to produce final casting 24.

Waste Form

Figure 5:
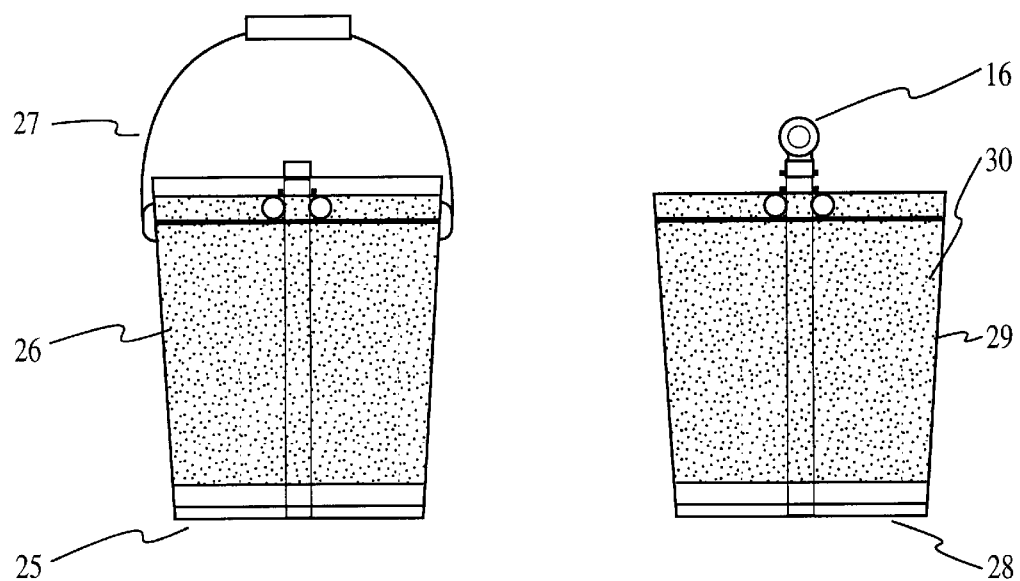
FIG. 5 illustrates a cross section of the final waste form in accordance with the present invention.

FIG. 5 illustrates a cross section of the final waste form in accordance with the present invention. As shown, the casting with the mold bucket assembly 25 includes a mold bucket assembly 25 and a mold bucket handle 27. The casting 28 without the mold bucket 26 includes swarf 29, and solidified binder 30. The lift cap 16 is also shown. The final waste form may be discarded after removing the casting from the mold bucket or left within the mold bucket.

The approximate dry weight composition of an individual casting is as follows:
1. VES Binder-42 pounds
2. Zirconium Swarf-19 pounds
3. Mold Assembly-5 pounds The net underwater weight of the casting is approximately 22 pounds which allows it to be easily handled underwater without lifting equipment. Although the weight of the waste is increased by the process, the waste volume is essentially the same. The solidification binder displaces the water occupying the void space within the swarf and replaces it with the binder. The weight increase is due to the binder within the void space. Except for the volume of the binder cap on the top and bottom of the castings, the final waste form volume is the same as the unprocessed swarf.

Testing was performed on castings produced using non-radioactive zirconium. Except for using non-radioactive material the operating conditions were identical to that used for radioactive material. Samples were removed from castings and tested for toxicity, compressive strength, and radiation stability.

Toxicity

To assure that the process did not introduce a toxic material into the waste stream, casting samples were tested per the Environmental Protection Agency (EPA) Toxicity Characteristic Leaching Procedure (TCLP), the disclosure of which is incorporated by reference. The samples were tested for volatile and semi-volatile organics, heavy metals, herbicides, and pesticides per the EPA SW-846 protocol, the disclosure of which is incorporated by reference. The waste form was found to be free of TCLP constituents except for trace amounts of barium, chromium, and lead. The barium, chromium, and lead detected was less than one-hundredth of the regulatory limits. Table I summarizes the test results.

TABLE I

TCLP TEST RESULTS
TOXICITY CHARACTERISTIC LEACHING PROCEDURE TEST RESULTS

| | Representative Sample Analysis | Detection Limit | Exceeds Regulatory Level? | | Regulatory Level | EPA Hazardous |
|---|---|---|---|---|---|---|
| | (mg/L) | (mg/L) | Yes | No | (mg/L) | Waste Number |
| TCLP Metals: | | | | | | |
| Arsenic | <0.050 | 0.050 | ☐ | ■ | 5.0 | D004 |
| Barium | 0.020 | 0.002 | ☐ | ■ | 100.0 | D005 |
| Cadmium | <0.004 | 0.004 | ☐ | ■ | 1.0 | D006 |
| Chromium | 0.008 | 0.007 | ☐ | ■ | 5.0 | D007 |
| Lead | 0.052 | 0.045 | ☐ | ■ | 5.0 | D008 |
| Mercury | <0.001 | 0.001 | ☐ | ■ | 0.2 | D009 |
| Selenium | <0.075 | 0.075 | ☐ | ■ | 1.0 | D010 |
| Silver | <0.007 | 0.007 | ☐ | ■ | 5.0 | D011 |
| TCLP Volatiles: | | | | | | |
| Benzene | ND*** | 0.005 | ☐ | ■ | 0.5 | D018 |
| Carbon Tetrachloride | ND | 0.005 | ☐ | ■ | 0.5 | D019 |
| Chlorobenzene | ND | 0.005 | ☐ | ■ | 100.0 | D021 |
| Chloroform | ND | 0.050 | ☐ | ■ | 6.0 | D022 |
| 1,4-Dichlorabenzene | ND | 0.005 | ☐ | ■ | 7.5 | D027 |
| 1,2-Dichloroethane | ND | 0.005 | ☐ | ■ | 0.5 | D028 |
| 1,1-Dichloroethylene | AD | 0.005 | ☐ | ■ | 0.7 | D029 |
| Methyl ethyl ketone | ND | 0.050 | ☐ | ■ | 200.0 | D035 |
| Pyridine* | ND | 0.050 | ☐ | ■ | 5.0 | D038 |
| Tetrachloroethylene | ND | 0.005 | ☐ | ■ | 0.7 | D039 |
| Trichloroethylene | ND | 0.005 | ☐ | ■ | 0.5 | D040 |
| Vinyl chloride | ND | 0.005 | ☐ | ■ | 0.2 | D043 |
| TCPL Semi-Volatiles: | | | | | | |
| o-Cresol** | ND | 0.005 | ☐ | ■ | 200.0 | D023 |
| m-Cresol** | ND | 0.005 | ☐ | ■ | 200.0 | D024 |
| p-Cresol** | ND | 0.005 | ☐ | ■ | 200.0 | D025 |
| Cresol** | | | ☐ | ■ | 200.0 | D026 |
| 2,4-Dinitrotoluene | ND | 0.050 | ☐ | ■ | 0.13 | D030 |
| Hexachlorobenzene | ND | 0.050 | ☐ | ■ | 0.13 | D032 |
| Hexachlorobutadiene | ND | 0.050 | ☐ | ■ | 0.5 | D033 |
| Hexachloroethane | ND | 0.050 | ☐ | ■ | 3.0 | D034 |
| Nitrobenzene | ND | 0.050 | ☐ | ■ | 2.0 | D036 |
| Pentachlorophenol | ND | 0.050 | ☐ | ■ | 100.0 | D037 |
| 2,4,5-Trichlorophenol | ND | 0.050 | ☐ | ■ | 400.0 | D041 |
| 2,4,6-Trichlorophenol | ND | 0.050 | ☐ | ■ | 2.0 | D042 |
| TCLP Pesticides and Herbicides: | | | | | | |
| Chlordane | ND | 0.010 | ☐ | ■ | 0.03 | D020 |
| 2,4-D | ND | 0.080 | ☐ | ■ | 10.0 | D016 |
| Endrin | ND | 0.001 | ☐ | ■ | 0.02 | D012 |
| Heptachlor (and its hydroxide) | ND | 0.001 | ☐ | ■ | 0.008 | D031 |
| Lindane | ND | 0.001 | ☐ | ■ | 0.4 | D013 |
| Methoxychlor | ND | 0.040 | ☐ | ■ | 10.0 | D014 |
| Toxaphene | ND | 0.100 | ☐ | ■ | 0.5 | D015 |
| 2,4,5-TP (Silvex) | ND | 0.008 | ☐ | ■ | 1.0 | D017 |

*A quantitation limit greater than the regulatory level becomes the regulatory level.
**If o-, m-, and p-cresol concentrations cannot be differentiated, give total cresol (D026) concentration
***ND — Not Detectable

Compressive Strength

Compressive strength tests were performed to assess the integrity of the casting. The Nuclear Regulatory Commission (NRC) guidelines for radioactive waste forms, the disclosure of which is incorporated by reference, recommend that the waste form have a minimum strength of 50 psi per American Society of Testing and Materials (ASTM) Standard C39, the disclosure of which is incorporated by reference. Testing per ASTM C39 showed the compressive strength to be 220 psi for samples removed from a 50 gallon casting and 2000 psi for samples removed from a 5 gallon casting. These strengths are an improvement over cement grout solidification waste forms which frequently fail the 50 psi guideline.

Radiation Stability

Isotopic analyses were performed to assess the maximum dose the final waste form would receive due to the radioactive decay of the zirconium swarf. Radioactive cobalt was found to be the most significant isotope. To evaluate the radiation stability of the waste form, samples were irradiated with a cobalt-60 source to receive a dose of $1.9 \times 10^8$ RADS. This dose was determined to be twice the maximum dose calculated from the isotopic analysis if all the activated isotopes were to completely decay. Except for minor discoloration, (darkening) of the samples there was no visual evidence that the irradiation affected the waste form. The samples were then tested for compressive strength per ASTM C39 and compared with the unirradiated tests. The initial yield strength of the samples was increased by the irradiation approximately 700–900 psi and the final compressive strength was decreased approximately 400 psi. The irradiation caused further cross-inking in the polymerization which increased the yield strength but initiated lattice defects which decreased the ductility and caused the samples to be more susceptible to fracture. Although there was a small decrease in the compressive strength, the strength of the irradiated waste form is still well above the above-mentioned NRC guidelines. The VES waste form is much more radiation resistant than other plastic type materials which often degrade and fail after receiving a dose of $10^8$ to $10^7$ RADS.

Quality Assurance

It became apparent during the testing and development work that the materials and process must be controlled to assure repeatable results. The process is sensitive to the formulation of the four ingredients, the water and initial binder temperature, the pouring time, and the shelf life of the binder and promoter. The following issues were addressed to assure that the process reliably produces a quality waste form.

Formulation

The formulation of the VES ingredients must be adjusted for the type of waste and the operating conditions. The application upon which the process was developed was for zirconium swarf with a bulk density of approximately 4–5 pounds per gallon which is submerged in 55° F. water. The ratio of binder-to-catalyst is fairly constant for many applications; however, the amount of promoter and additive must be adjusted for the waste loading, water temperature, and inhibitor content in the VES binder. Improper determination of the formulation may result in excessive cracking, soft castings, or incomplete solidification. To assure that a correct formulation is used, a Process Control Program (PCP) is implemented. The PCP consists of running smaller two liter solidification tests under the operating condition temperatures and correlating the results to the fill scale solidification. The PCP tests are run whenever changes occur in the operating conditions, the waste type, or a different lot or batch of VES ingredients is used. The following VES formulation for a 5 gallon casting was recommended to provide the best performance for this particular application.

|  | Volume | Weight |
|---|---|---|
| Binder | 18,900 ml | 19,655 gm |
| Catalyst | 315 ml | 360 gm |
| Additive | 265 + 0/− 100 ml | 305 + 0/− 115 gm |
| Promoter | 35 +/− 5 ml | 33 +/− 5 gm |

Binder/catalyst/additive/promoter volume ratio — 1000/17/14/2
Binder/catalyst/additive/promoter weight ratio — 1000/18/16/2

This formulation provided consistent results for a series of PCP and full scale tests. Because the manufacturers of the VES binder vary the amount and type of inhibitor in the binder, this formulation may need to be adjusted whenever using a different shipment of binder. For this reason, a PCP test is run if a binder with a different batch or lot number is used even though the waste and operating conditions are the same. An inhibitor is added to the binder by the manufacturer to extend the useful shelf life of the binder. A 50° F. peak temperature difference is correlated between a PCP test and a 5 gallon casting of approximately 20 lbs of zirconium swarf solidified in 55° F. water. The PCP test reaches a higher temperature since it is performed without a waste loading. The waste loading in the actual process acts as a heat sink and reduces the peak temperature during the exothermic reaction. After the formulation is verified through the PCP tests, the ingredients are accurately premeasured and packaged in a kit for direct use in the solidification process. The time to gelation and peak temperature is also monitored in the PCP tests to ensure sufficient time is available to complete the process before the binder solidifies.

Temperature

The peak temperature of the exothermic reaction (referred to as the exotherm temperature) provides a reliable measure of the quality of the solidification. Experience through the development testing has shown that a high quality casting is produced if the exotherm temperature is between 140° F. and 210° F. At lower temperatures the castings lose hardness and have a softer rubbery consistency. At higher temperatures the castings crack and release a small amount of residue into the water.

The exotherm temperature is significantly affected by the temperature of the water in which the casting is poured. Adjustments can be made in the formulation to ensure proper solidification performance when the water temperature has changed. Typically, more promoter and additive are used for colder temperatures. Most of the testing performed in this work was for water temperatures between 55° F. and 85° F. It appears that below a water temperature of 50° F., the solidification is unstable and additional testing with different ingredients would be required to achieve consistent results. Good repeatability is achieved using the above formulation for castings performed in 55° F. water.

The initial temperature of the binder when it is mixed with other ingredients also affects the exotherm temperature and more significantly affects the gelation time in which the binder begins to harden. For the above formulation, the binder is cooled to 55° F. before mixing. By cooling the binder the gelation time is extended while maintaining the desired exotherm temperature. If the same formulation were used, for example, with 85° F. binder, the gelation time would be about 2 hours compared to about 7 hours if the binder were cooled to 55° F. The exotherm temperature for the 85° F. would be approximately 30–50° F. higher than the 55° F. binder.

The water temperature and the initial temperature of the binder prior to mixing is controlled administratively through an operating procedure using the following conditions:

| | |
|---|---|
| Water Temperature | 55 +/- 2° F. |
| Initial binder temperature prior to mixing | 55 +/- 2° F. |
| Ambient air temperature | 60–90° F. |
| Zircaloy swarf content (underwater weight) | 15–20 lbs |

Pouring Time

The pouring time must be controlled to ensure that the binder is transferred into the casting before gelation begins and because if the mixed ingredients are allowed time to warm up to the ambient temperature, the solidification performance may be affected. To a lesser degree, the flow rate of the pour must be controlled to minimize the formation of voids in the casting. The pouring time is also controlled administratively by the operating procedure.

Shelf Life

Figure 6:
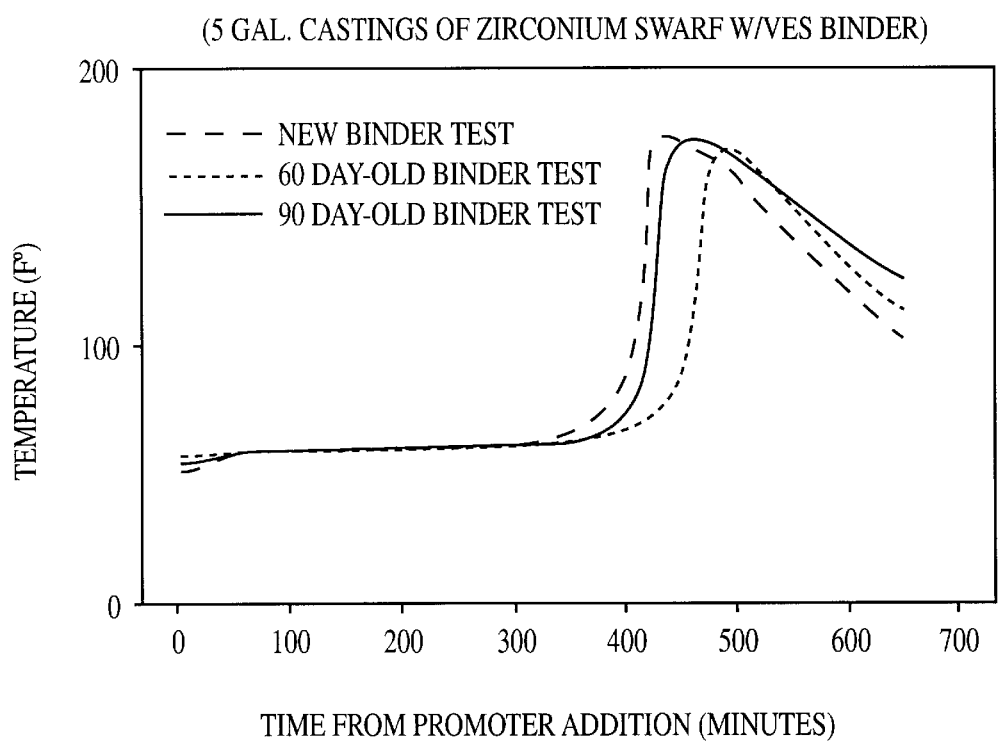
FIG. 6 shows test results of the casting solidification over a three-month period to assure the shelf life of the binder.

The VES binder has a shelf life of approximately 3 to 6 months after which the inhibitor is expended and the binder begins to gel without the addition of the other ingredients. As the binder reaches the end of its shelf life, its solidification performance is affected. Testing was performed which established that consistent results are obtained for 5 gallon castings performed over a three month period (FIG. 6).

Accordingly, an underwater solidification process has been developed which effectively stabilizes zirconium swarf into a waste form acceptable for disposal as a radioactive waste. Testing has shown that the process will significantly reduce the waste volume in comparison to hydraulic cements and ensures safety by utilizing the inherent safety of the water coverage. Attention must be given to quality control aspects to assure repeatable results. The process has been developed to reliably produce good solidification performance when performed using the controls addressed herein. Although this development and testing work has been limited to zirconium swarf generated by band saw cutting operations, this work could be extended to other applications.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

What is claimed is:

1. A method for treating cutting swarf, said method comprising:
   collecting swarf in a vessel; said vessel having a top and a bottom;
   compressing said swarf in said vessel;
   injecting a binder mixture comprising vinyl ester styrene into the bottom of said vessel to fill void volume while maintaining said vessel and said swarf submerged under water; wherein said injecting, and said compressing of said swarf, provides an even flow of said binder mixture upward through said swarf to fill said void volume;
   forming a mixture comprising said swarf and said vinyl ester styrene and maintaining said mixture under water; and
   curing said mixture into a solid matrix.

2. The method for treating swarf of claim 1, comprising preparing said solid matrix for storage.

3. The method for treating swarf of claim 1, wherein said swarf comprises a metal selected from a group consisting of zirconium, magnesium, and thorium.

4. The method for treating swarf of claim 3, wherein said swarf comprises zirconium.

5. The method for treating swarf of claim 1, wherein said swarf is radioactive.

6. The method for treating swarf of claim 4, wherein said swarf comprises radioactive zirconium generated during operations to prepare spent nuclear fuel for storage.

7. The method for treating swarf of claim 1, wherein said binder mixture comprising said vinyl ester styrene, further comprises a catalyst, and a promotor.

8. The method for treating swarf of claim 7, wherein said binder mixture further comprises a temperature suppressant.

9. The method for treating swarf of claim 1, comprising solidifying said swarf in layers in said vessel.

10. The method for treating swarf of claim 9, wherein said vessel for solidifying said swarf comprises a mold comprising a liner.

11. The method for treating swarf of claim 10, wherein said mold comprises pre-installed distribution laterals for distributing said vinyl ester styrene.

12. The method for treating swarf of claim 11, wherein said mold is made of vinyl ester fiberglass.

13. The method for treating swarf of claim 1, comprising loading said swarf underwater into said vessel, wherein said vessel comprises a bottom orifice plate and a top orifice plate.

14. The method for treating swarf of claim 13, comprising formulating said binder mixture in a pouring bucket.

15. The method for treating swarf of claim 14, comprising placing a lid on said pouring bucket and rotating said pouring bucket to a substantially horizontal position to start flow of the binding mixture into said vessel.

16. The method of claim 13, wherein said swarf is compressed by moving said top orifice plate.

17. The method for treating swarf of claim 1, wherein said curing comprises an exothermic reaction at an exotherm temperature within a range of about 140° F. to about 210° F.

18. The method for treating swarf of claim 17, wherein said water is at a temperature within a range of about 55° F. and to about 85° F.

19. The method for treating swarf of claim 1, wherein said binder mixture is cooled to a temperature below room temperature before injecting it into said vessel containing said swarf.

20. The method for treating swarf of claim 19 wherein said binder is at a temperature of about 55° F.

21. The method for treating swarf of claim 1 wherein said swarf exhibits an ignitable hazard, and wherein said method stabilizes the ignitable hazard to produce a waste form of said swarf acceptable for land disposal.

* * * * *